though not as efficient as the polyamino compounds may be used. Examples of these monoamino compounds are nitrilotriacetic acid and triethanolamine.

United States Patent Office 3,099,521
Patented July 30, 1963

3,099,521
WATER TREATMENT
Hans G. Arensberg, Midland, Mich., assignor to The Dow Chemical Company, Midland, Mich., a corporation of Delaware
No Drawing. Filed Oct. 3, 1960, Ser. No. 59,820
20 Claims. (Cl. 21—2.7)

This invention relates to water treatment. More particularly it pertains to an improved corrosion inhibiting composition and an improved process for treating water.

Various water soluble phosphates have been used to inhibit corrosion of water for many years. While effective corrosion inhibition may be obtained by the use of phosphates, scaling of the equipment is frequently encountered when the phosphates are used in quantities necessary to obtain the desired corrosion protection. Scaling will reduce heat transfer, cause corrosion and mechanically hinder the proper operation of equipment.

It is therefore an object of this invention to provide a corrosion inhibitor employing phosphates which retards scaling or the precipitation of the hardness salts in the water. A further object is to provide a process for the treatment of water to inhibit the corrosion without increasing the scaling tendency of the water.

The above and other objects are attained according to the invention by using as a corrosion inhibiting composition a mixture of a water soluble, molecularly dehydrated polyphosphate metal salt, a water soluble orthophosphate salt, and an organic chelating agent, such as monoaminocarboxylic acids, polyaminocarboxylic acids, hydroxycarboxylic acids of from 4 to 7 carbon atoms having the hydroxy and the carboxylic acid groups on the same or adjacent carbon atoms or the metal salts of these acids. By treating industrial waters with the above mixture corrosion protection is obtained without the precipitation or scaling normally encountered when the phosphates are used individually or as a mixture. The compositions and method of the present invention are particularly effective for water used in industrial applications, such as cooling towers, air conditioning systems, and distributing systems where the water is in contact with ferrous metals.

It is essential that all three constituents, the water soluble molecular dehydrated polyphosphate salt, the water soluble orthopolyphosphate salt, and the organic chelating agent be present to obtain the corrosion protection without the precipitation. When only a molecularly dehydrated polyphosphate is used with an organic chelating agent, practically no corrosion inhibition is obtained, while if the organic chelating agent is not used precipitation or scaling is obtained.

In treatment of water to obtain the corrosion inhibition without precipitation or scaling, the molecular dehydrated polyphosphate is added to the water in an amount of from 5 to 80 parts of the molecular dehydrated polyphosphate per million parts of water, with 10 to 30 parts per million being preferred. The orthophosphate is used in an amount of from 1 to 40 parts per million, preferably 5 to 20 parts per million, while the organic chelating agent is employed in an amount of 1 to 50 parts per million, preferably between 10 to 25 parts per million. The content of the molecularly dehydrated polyphosphate and of the orthophosphate as expressed herein as parts per million is based on the $PO_4$ content of the salts.

Although the particular hardness of the water does not greatly affect the concentrations used, it is generally preferred to vary the amount and ratio of the particular constituents somewhat with the hardness of the water. With increase of hardness the amount of the organic chelating agent is generally increased, while the orthophosphate is generally reduced. The amount of the polyphosphate generally remains the same. For example, with a water having a total hardness of 400 p.p.m. the molecularly dehydrated phosphate is preferably added to the water in an amount of about 25 to 30 p.p.m. The chelating agent used is in an amount of 15–20 p.p.m., while the amount of orthophosphate added is in the range of 5 p.p.m. However, if the water has a total hardness of 80, the amount of the inhibitor preferred is in the range of 20 to 25 p.p.m. of the molecular dehydrated polyphosphate, 5 to 10 p.p.m. of the organic chelating agent, and 15 to 20 p.p.m. of the orthophosphate.

While the individual constituents added to the water may be added separately, it is convenient to obtain a composition consisting of a mixture of the molecularly dehydrated phosphate, the orthophosphate and the organic chelating agent. When the composition containing the three constituents is used, generally, the composition is such that the mixture will contain from 30 to 80 weight percent of the polyphosphate, from 10 to 40 weight percent of the organic chelating agent and the remainder being the orthophosphate with the latter constituent being present in the mixture in an amount of at least 5 weight percent. A composition containing the constituents in the above weight percent generally has the constituents in the proper proportions so that upon the addition of a given amount of the composition to the water the desired ratio of each of the constituents in the water is obtained. A mixture containing from 40 to 65 weight percent of the molecularly dehydrated polyphosphate, 5 to 25 weight percent of the orthophosphate and 15 to 40 weight percent of the organic chelating agent is most often used. This composition has the proper ratio of the constituents for most industrial waters encountered.

Sodium tripolyphosphate and tetrasodium pyrophosphate are the preferred molecular dehydrated phosphates. However, any water soluble molecularly dehydrated phosphate metal salt which is derived from a monobasic or a dibasic orthophosphate or from orthophosphoric acid or mixture of the two by the elimination of water, such as metaphosphates, tripolyphosphates and pyrophosphates, may be used in the inhibitor. Thus, by the term "molecularly dehydrated phosphate," it is meant any phosphate which is derived from a monobasic or othophosphoric acid or mixtures of the two by elimination of water of constitution therefrom. The alkali metal salts of the molecularly dehydrated phosphates and of the orthophosphates are preferred with sodium and potassium being most often used.

The organic chelating agents which may be used are the polyaminocarboxylic acids, their metal salts, and polyamino alcohols having the general formula:

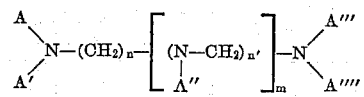

where $n$ and $n'$ represent an integer of 2 or 3, $m$ represents zero or an integer, and A, A', A'', A''', and A'''' are radicals selected from the group consisting of

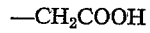

—$CH_2CH_2OH$, and —$CH_2COOM$ where M is one equivalent of an alkali or alkaline earth metal or ammonium.

Illustrative examples of the polyaminocarboxyl type chelating agents are ethylenediaminetetraacetic acid, diethylenetriaminepentaacetic acid, hydroxyethylethylenediaminetriacetic acid, dihydroxyethylethylenediaminediacetic acid, and also the metal salts of the above agents, such as salts of the alkali metals as lithium, sodium, and potassium, the alkaline earth metals as magnesium, calcium, barium, strontium, and ammonium.

Also the monoaminocarboxylic acids, their salts, and monoamino alcohols having the general formula may be used:

where A, A', and A'' represent the radicals listed above. Illustrative examples of the monoaminocarboxyl type compounds are dihydroxyethylglycine, hydroxyethyliminodiacetic acid, triethanolamine, nitrilotriacetic acid, and the metal salts of the above acids of the alkali metals, alkaline earth metals and ammonium as listed above.

In addition to the poly- and monoaminocarboxylic acid type compounds, a hydroxycarboxylic acid of from 4 to 7 carbon atoms having the hydroxyl and the carboxyl radicals on the same or adjacent carbon atoms may be used. Illustrative examples of these chelating agents are citric acid, gluconic acid, tartaric acid, saccharic acid, and salicylic acid.

The polyaminocarboxylic acid type chelating agents are generally most effective. The alkali metal salts of these acids are usually used with the sodium salts being preferred. However, it is apparent that when the chelating agents are used in acid form some of the acid is converted to the salt form by the metal ions present in the water.

To further illustrate the invention, a series of tests was made where a sample of an SAE 1010 steel was exposed to a water flow of 1.9 feet per second for 24 hours at 110° F. and the weight loss determined. Three types of water having different hardness were used. In each test the pH of the water was adjusted to 7 by the addition of sodium hydroxide prior to performance of the tests.

The analysis of the particular water used in the test was as follows:

| Water type | I | II | III |
|---|---|---|---|
| Calcium hardness as $CaCO_3$, p.p.m. | 250 | 125 | 50 |
| Magnesium hardness as $CaCO_3$, p.p.m. | 150 | 75 | 30 |
| Chlorides as NaCl, p.p.m. | 1,350 | 675 | 270 |
| Sulphates as $Na_2SO_4$, p.p.m. | 1,400 | 700 | 280 |
| Total alkalinity as $CaCO_3$, p.p.m. | 5 | 2.5 | 1.25 |
| pH (adjusted) | 7 | 7 | 7 |

The results obtained and the pertinent data are shown in the table below.

In illustrating the decrease in scaling and precipitation obtained by treating the water with the three constituent composition, a series of runs was made where 400 milliliter samples of water having a 100 p.p.m. of total hardness and 0.69 p.p.m. of ferric chloride as ferric ion and at a pH of 7.6 were treated with the three constituent composition of the instant invention, with a phosphate only, and with one of the phosphates and the chelating agent. The treated water samples were allowed to set at 70° C. for 24 hours. The samples were then filtered and the precipitate obtained weighed. The pertinent data and results obtained are shown in the table below.

| Water sample | Treatment | | | Precipitate obtained, mg. |
|---|---|---|---|---|
| | $Na_5P_3O_{10}$, p.p.m. | $Na_2HPO_4$, p.p.m. | Tetrasodium salt of ethylenediaminetetraacetic acid, p.p.m. | |
| 1 | 25 | 5 | 15 | 0.2 |
| 2 | 25 | 5 | | 1.6 |
| 3 | 25 | | | 1.7 |
| 4 | 0 | 5 | 15 | 2.6 |
| 5 | 0 | 5 | 0 | 2.5 |

What is claimed is:

1. A process of inhibiting the corrosion of metals and scaling in a water system which comprises adding from 5 to 80 parts of a water soluble molecularly dehydrated polyphosphate salt, from 1 to 40 parts of water soluble orthophosphate salt, and from 1 to 50 parts of an organic chelating agent per million parts of water and contacting the metal continuously with the treated water, said organic chelating agent being selected from the group consisting of (1) polyaminocarboxylic acid type compounds having the general formula:

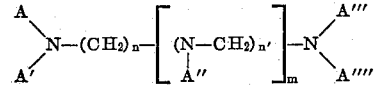

where $n$ and $n'$ represent an integer selected from the group consisting of 2 and 3; $m$ represents a figure selected from the group consisting of zero and integers; and A, A', A'', A''', and A'''' are radicals selected from the group consisting of $CH_2COOH$, $CH_2CH_2OH$, and $CH_2COOM$, where M is an equivalent selected from the group consisting of alkali metals, alkaline earth metals, and ammonium;

| Run | Molecularly dehydrated phosphates added | P.p.m. | Chelating agent added | | Ortho-Phosphate | P.p.m. | Precipitation | Water No. | Percent reduction in corrosion |
|---|---|---|---|---|---|---|---|---|---|
| | | | Agent | P.p.m. | | | | | |
| Blank a | | | | | | | Heavy | I | 0 |
| Blank b | $Na_5P_3O_{10}$ | 25 | | | | | Moderate | I | 47 |
| Blank c | | | Tetrasodium salt of ethylenediaminetetraacetic acid. | 15 | | | Heavy | I | −13.4 |
| Blank d | | | | | Sodiumorthophosphate. | 5 | do | I | 37.9 |
| Blank e | $Na_5P_3O_{10}$ | 25 | Tetrasodium salt of ethylenediaminetetraacetic acid. | 15 | | | do | I | 31.0 |
| 1 | $Na_5P_3O_{10}$ | 25 | do | 15 | Sodiumorthophosphate. | 5 | Trace | I | 97.7 |
| Blank e₁ | | | do | 15 | do | 5 | Heavy | I | 14.6 |
| 2 | $Na_6P_6O_{18}$ | 25 | do | 15 | do | 5 | Trace | I | 95.8 |
| 3 | $Na_4P_2O_7$ | 25 | do | 15 | do | 5 | do | I | 98.3 |
| 4 | $Na_5P_3O_{10}$ | 25 | Sodium salt of hydroxyethylethylenediaminetriacetic acid. | 15 | do | 5 | do | I | 96.4 |
| 5 | $Na_5P_3O_{10}$ | 25 | Triethylanolamine | 15 | do | 5 | Slight | I | 96.3 |
| 6 | $Na_5P_3O_{10}$ | 25 | Sodium salt of diethylenetriaminepentaacetic acid. | 15 | do | 5 | Trace | I | 95.2 |
| 7 | $Na_5P_3O_{10}$ | 25 | Sodium salt of dihydroxyethylglycine acid. | 15 | do | 5 | Slight | I | 95.9 |
| 8 | $Na_5P_3O_{10}$ | 25 | Salicylic acid | 15 | do | 5 | Trace | I | 96.6 |
| 9 | $Na_5P_3O_{10}$ | 25 | Citric acid | 15 | do | 5 | Moderate | I | 97.5 |
| Blank f | | | | | | | Heavy | II | 0 |
| 10 | $Na_5P_3O_{10}$ | 25 | Tetrasodium salt of ethylenediaminetetraacetic acid. | 15 | Sodiumorthophosphate. | 5 | Trace | II | 96.8 |
| 11 | $Na_5P_3O_{10}$ | 25 | do | 15 | do | 10 | do | II | 98.5 |
| Blank g | | | | | | | Heavy | III | 0 |
| 12 | $Na_5P_3O_{10}$ | 25 | Tetrasodium salt of ethylenediaminetetraacetic acid. | 15 | Sodiumorthophosphate. | 5 | Slight | III | 95.7 |
| 13 | $Na_5P_3O_{10}$ | 25 | do | 25 | do | 10 | Trace | III | 96.2 |
| 14 | $Na_4P_2O_7$ | 25 | do | 25 | do | 10 | do | III | 98.0 |

(2) monoaminocarboxylic acid type compounds having the general formula:

where A, A', and A" represent radicals set forth above; and (3) hydroxycarboxylic acids of 4 to 7 carbon atoms having the hydroxyl and carboxyl groups on the same or adjacent carbon atoms and the alkaline metal or alkaline earth metal salts thereof.

2. A process according to claim 1 wherein the organic chelating agent is a polyaminocarboxylic acid type compound having the general formula:

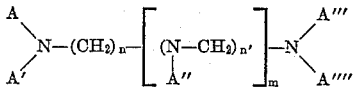

where $n$ and $n'$ represent an integer selected from the group consisting of 2 and 3; $m$ represents a figure selected from the group consisting of zero and integers; and A, A', A", A''', and A'''' are radicals selected from the group consisting of $CH_2COOH$, $CH_2CH_2OH$, and $CH_2COOM$, where M is an equivalent selected from the group consisting of alkali metals, alkaline earth metals, and ammonium.

3. A process according to claim 1 wherein the organic chelating agent is monoaminocarboxylic acid type compound having the formula:

where A, A', and A" are radicals selected from the group consisting of $CH_2COOH$, $CH_2CH_2OH$, and $CH_2COOM$ where M is an equivalent selected from the group consisting of alkali metals, alkaline earth metals and ammonium.

4. A process according to claim 1 wherein the organic chelating agent is a hydroxycarboxylic acid of from 4 to 7 carbon atoms having the hydroxyl and the carboxyl groups on the same or adjacent carbon atoms and the alkali metal and alkaline earth metal salts thereof.

5. A process of inhibiting the corrosion and scaling of metals in a water system, which comprises adding from 5 to 80 parts of a molecular dehydrated alkali metal polyphosphate, from 1 to 40 parts of an alkali metal orthophosphate, and from 1 to 50 parts of the sodium salt of ethylenediaminetetraacetic acid per million parts of water, and contacting the metal continuously with the water.

6. A process according to claim 5 wherein the molecular dehydrated alkali metal phosphate is added in an amount of from 10 to 30 parts, the alkali metal orthophosphate is added in amount of from 5 to 20 parts, and the sodium salt of ethylenediaminetetraacetic acid in an amount of from 10 to 25 parts per million parts of water.

7. A process according to claim 6 wherein the molecular dehydrated polyphosphate is sodium tripolyphosphate, and the orthophosphate is sodium orthophosphate.

8. A process of inhibiting corrosion and scaling of metals in a water system, which comprises adding from 5 to 80 parts of a molecular dehydrated alkali metal polyphosphate, from 1 to 40 parts of an alkali metal orthophosphate, and from 1 to 50 parts of the sodium salt of diethylenediaminepentaacetic acid per million parts of water, and contacting the metal continuously with the water.

9. A process according to claim 8 wherein the molecular dehydrated alkali metal phosphate is added in an amount of from 10 to 30 parts, the alkali metal orthophosphate is added in amount of from 5 to 25 parts, and the sodium salt of the diethylenediaminepentaacetic acid in an amount of from 10 to 25 parts per million parts of water.

10. A process according to claim 9 wherein the molecular dehydrated polyphosphate is sodium tripolyphosphate, and the orthophosphate is sodium orthophosphate.

11. A process for inhibiting corrosion and scaling of metals in a water system, which comprises adding from 5 to 80 parts of a molecular dehydrated alkali metal polyphosphate, from 1 to 40 parts of an alkali metal orthophosphate, and from 1 to 50 parts of dehydroxyethylglycine acid per million parts of water, and contacting the metal continuously with the water.

12. A process according to claim 11 wherein the molecular dehydrated alkali metal phosphate is sodium tripolyphosphate and is added in an amount of from 10 to 30 parts, the alkali metal orthophosphate is sodium orthophosphate and is added in an amount of from 5 to 25 parts, and the dehydroxyethylglycine acid is added in an amount of from 10 to 25 parts per million parts of water.

13. A process of inhibiting corrosion and scaling of metals in a water system, which comprises adding from 5 to 80 parts of a molecular dehydrated alkali metal polyphosphate, from 1 to 40 parts of an alkali metal orthophosphate, and from 1 to 50 parts of nitriloacetic acid per million parts of water, and contacting the metal continuously with the water.

14. A process according to claim 13 wherein the molecular dehydrated alkali metal phosphate is sodium tripolyphosphate and is added in an amount of from 10 to 30 parts, and alkali metal orthophosphate is sodium orthophosphate and is added in amount of from 5 to 25 parts, and the nitriloacetic acid in an amount of from 10 to 25 parts per million parts of water.

15. A process of inhibiting corrosion and scaling of metals in a water system, which comprises adding from 10 to 30 parts of sodium tripolyphosphate, from 5 to 25 parts of sodium orthophosphate, and from 10 to 25 parts of citric acid per million parts of water, and contacting the metal continuously with the water.

16. A process of inhibiting corrosion and scaling of metals in a water system, which comprises adding from 10 to 30 parts of sodium tripolyphosphate, from 5 to 25 parts of sodium orthophosphate, and from 10 to 25 parts of salicylic acid per million parts of water, and contacting the metal continuously with the water.

17. A process of inhibiting corrosion and scaling of metals in a water system, which comprises adding from 10 to 30 parts of sodium tripolyphosphate, from 3 to 25 parts of sodium orthophosphate, and from 10 to 25 parts of tartaric acid per million parts of water, and contacting the metal continuously with the water.

18. A water treating composition comprising a mixture consisting essentially of a molecularly dehydrated alkali metal polyphosphate in an amount of from 30 to 80 weight percent, an alkali metal orthophosphate in an amount of from 5 to 40 weight percent, and the remainder an organic chelating agent selected from the group consisting of (1) polyaminocarboxylic acid type compounds having the general formula:

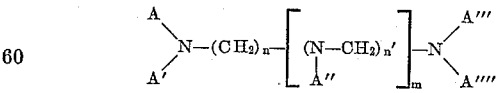

where $n$ and $n'$ represent an integer selected from the group consisting of 2 and 3; $m$ represents a figure selected from the group consisting of zero and integers; and A, A', A", A''', and A'''' are radicals selected from the group consisting of $CH_2COOH$, $CH_2CH_2OH$, and $CH_2COOM$ where M is an equivalent selected from the group consisting of alkali metals and alkaline earth metals and ammonium; (2) monoaminocarboxylic acid type compound having the general formula:

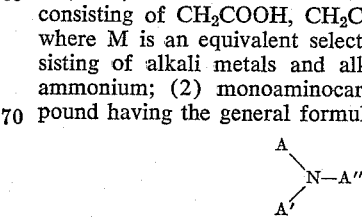

where A, A' and A" represent radicals set forth above;

and (3) hydroxycarboxylic acids of 4 to 7 carbon atoms having the hydroxyl and carboxyl groups on the same or adjacent carbon atoms, said organic chelating agent being present in an amount of at least 10 weight percent.

19. A composition according to claim 18 wherein a molecularly dehydrated alkali metal phosphate is present in an amount of from 40 to 60 weight percent, the alkali metal orthophosphate is present in an amount of from 5 to 25 weight percent, and the organic chelating agent is present in amount of from 15 to 40 weight percent.

20. A composition according to claim 19 wherein the molecularly dehydrated alkali metal phosphate is sodium tripolyphosphate, the alkali metal orthophosphate is sodium orthophosphate, and the organic chelating agent is the tetrasodium salt of ethylenediaminetetraacetic acid.

References Cited in the file of this patent

UNITED STATES PATENTS

| | | |
|---|---|---|
| 2,560,839 | Ayo et al. | July 17, 1951 |
| 2,780,598 | Cafcas | Feb. 5, 1957 |
| 2,786,033 | Gottshall et al. | Mar. 19, 1957 |
| 2,872,281 | Kahler et al. | Feb. 3, 1959 |
| 2,890,175 | Kipps | June 9, 1959 |
| 2,900,222 | Kahler et al. | Aug. 18, 1959 |
| 2,999,732 | Kahler et al. | Sept. 12, 1961 |